United States Patent
Noheji

(10) Patent No.: US 9,065,573 B2
(45) Date of Patent: Jun. 23, 2015

(54) DIGITAL COHERENT OPTICAL RECEIVER, CONTROL METHOD OF THE SAME, AND TRANSMISSION APPARATUS

(71) Applicant: FUJITSU LIMITED, Kawasaki-shi, Kanagawa (JP)

(72) Inventor: Kiyotoshi Noheji, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/946,535

(22) Filed: Jul. 19, 2013

(65) Prior Publication Data
US 2014/0099130 A1 Apr. 10, 2014

(30) Foreign Application Priority Data
Oct. 4, 2012 (JP) ................................. 2012-222458

(51) Int. Cl.
H04B 10/61 (2013.01)
(52) U.S. Cl.
CPC ................... *H04B 10/6161* (2013.01)
(58) Field of Classification Search
CPC .... H04B 10/61; H04B 10/611; H04B 10/616; H04B 10/6161; H04B 10/63; H04B 10/64
USPC .......................................... 398/65, 202–214
See application file for complete search history.

(56) References Cited

U.S. PATENT DOCUMENTS

| 2004/0179837 | A1* | 9/2004 | Bock et al. ....................... 398/25 |
| 2009/0220249 | A1* | 9/2009 | Mizuguchi .................... 398/202 |
| 2009/0226189 | A1 | 9/2009 | Ito |
| 2010/0215365 | A1* | 8/2010 | Fukuchi .......................... 398/43 |
| 2011/0188866 | A1* | 8/2011 | Maeda ........................... 398/162 |
| 2011/0229127 | A1 | 9/2011 | Sakamoto et al. |

FOREIGN PATENT DOCUMENTS

| JP | 2006-522508 | 9/2006 |
| JP | 2009-212994 | 9/2009 |
| JP | 2010-028470 | 2/2010 |
| JP | 2011-199687 | 10/2011 |
| WO | 2004/088883 | 10/2004 |

\* cited by examiner

*Primary Examiner* — David Payne
*Assistant Examiner* — Casey Kretzer
(74) *Attorney, Agent, or Firm* — Fujitsu Patent Center

(57) ABSTRACT

A digital coherent optical receiver executing coherent reception of a phase-modulated optical signal, includes: a moving average section configured to execute a moving average for received data obtained by sampling of the phase-modulated optical signal; a compensator configured to compensate a wavelength dispersion value of the phase data having been executed with the moving average; and a control section configured to determine a moving average frequency to be executed by the moving average section based on the compensated wavelength dispersion value.

15 Claims, 16 Drawing Sheets

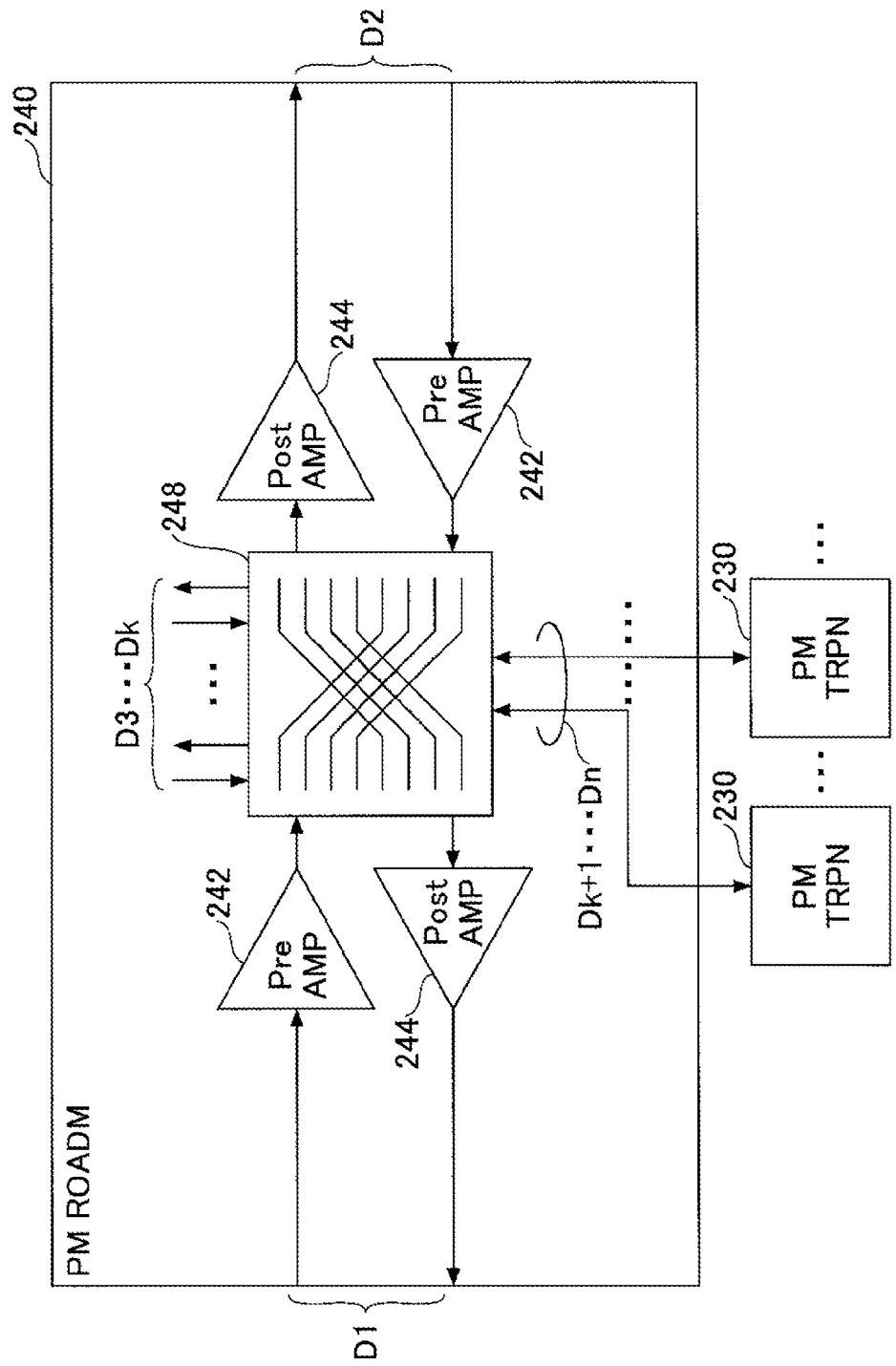

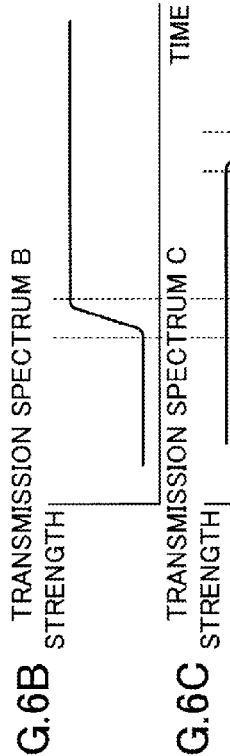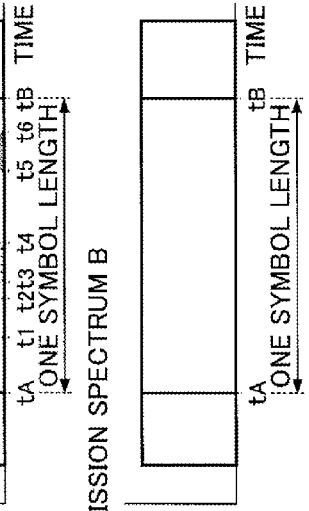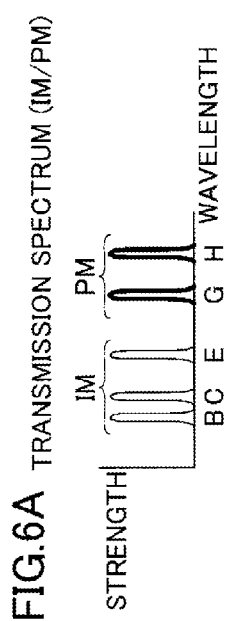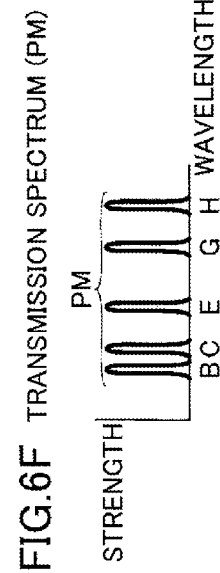
FIG.6A TRANSMISSION SPECTRUM (IM/PM)
FIG.6B TRANSMISSION SPECTRUM B
FIG.6C TRANSMISSION SPECTRUM C
FIG.6D TRANSMISSION SPECTRUM E
FIG.6E TRANSMISSION SPECTRUM G
FIG.6F TRANSMISSION SPECTRUM (PM)
FIG.6G TRANSMISSION SPECTRUM B

DIGITAL COHERENT OPTICAL RECEIVER, CONTROL METHOD OF THE SAME, AND TRANSMISSION APPARATUS

CROSS-REFERENCE TO RELATED APPLICATIONS

This application is based upon and claims the benefit of priority of the prior Japanese Priority Application No. 2012-222458 filed on Oct. 4, 2012, the entire contents of which are hereby incorporated by reference.

FIELD

The disclosures herein relate to a digital coherent optical receiver, a control method of the same, and a transmission apparatus.

BACKGROUND

As backbone communication networks evolve to support a longer distance and a larger capacity, optical transmission systems have been developed. As signal modulation schemes used in an optical transmission system, there is an intensity modulation (IM) scheme, where a signal to be transmitted is superposed with a signal light, and a phase modulation (PM) scheme. The PM scheme is used in a digital coherent receiving scheme (refer to, for example, Patent Document 1).

PATENT DOCUMENTS

[Patent Document 1] Japanese Laid-open Patent Publication No. 2009-212994

In a receiver in an optical transmission system, a light-electricity conversion section converts received light into an electrical signal, and an analog/digital convertor converts an analog signal into a digital signal. Also in the receiver, to smooth the digital signal, a moving average section executes a moving average, a wave-form-distortion compensation section compensates a waveform distortion, and after that, a demodulation section demodulates the signal. At this time, a desirable moving average frequency to be executed differs with modulation schemes used for other wavelengths in a transmission line. Therefore, in an optical transmission system where more than one modulation schemes coexist, a digital coherent optical receiver needs to switch between more than one moving average frequencies suited to the modulation schemes for proper operation. However, with conventional technologies, such control of moving average frequencies cannot be implemented.

SUMMARY

According to an embodiment, a digital coherent optical receiver executing coherent reception of a phase-modulated optical signal, includes: a moving average section configured to execute a moving average for received data obtained by sampling of the phase-modulated optical signal; a compensator configured to compensate a wavelength dispersion value of the phase data having been executed with the moving average; and a control section configured to determine a moving average frequency to be executed by the moving average section based on the compensated wavelength dispersion value.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

BRIEF DESCRIPTION OF DRAWINGS

FIG. 2B is a schematic view illustrating a configuration example of a PM transmission apparatus;

FIGS. 6A-6G are schematic views illustrating XPM;

DESCRIPTION OF EMBODIMENTS

According to at least one embodiment, it is possible to set a proper moving average frequency for an IM/PM transmission line or a PM transmission line.

<Modulation Schemes Used in Optical Transmission System>

As described above, modulation schemes used in an optical transmission system include intensity modulation (IM) and phase modulation (PM).

IM is a modulation scheme in which on/off of light strength is allocated to a binary-valued signal to be detected directly.

PM transmits information in proportion to a phase of light. PM is effective in solving a problem such as a decline of noise margin with respect to an Optical Signal to Noise Ratio (OSNR), which arises with an increase of transmission bit rate per wavelength; wavelength dispersion of a transmission line; polarization mode dispersion; or a wavelength distortion caused by a nonlinear effect or the like. With these characteristics, PM is used for a longer distance transmission than IM.

<Network Configuration>

Figure 1:
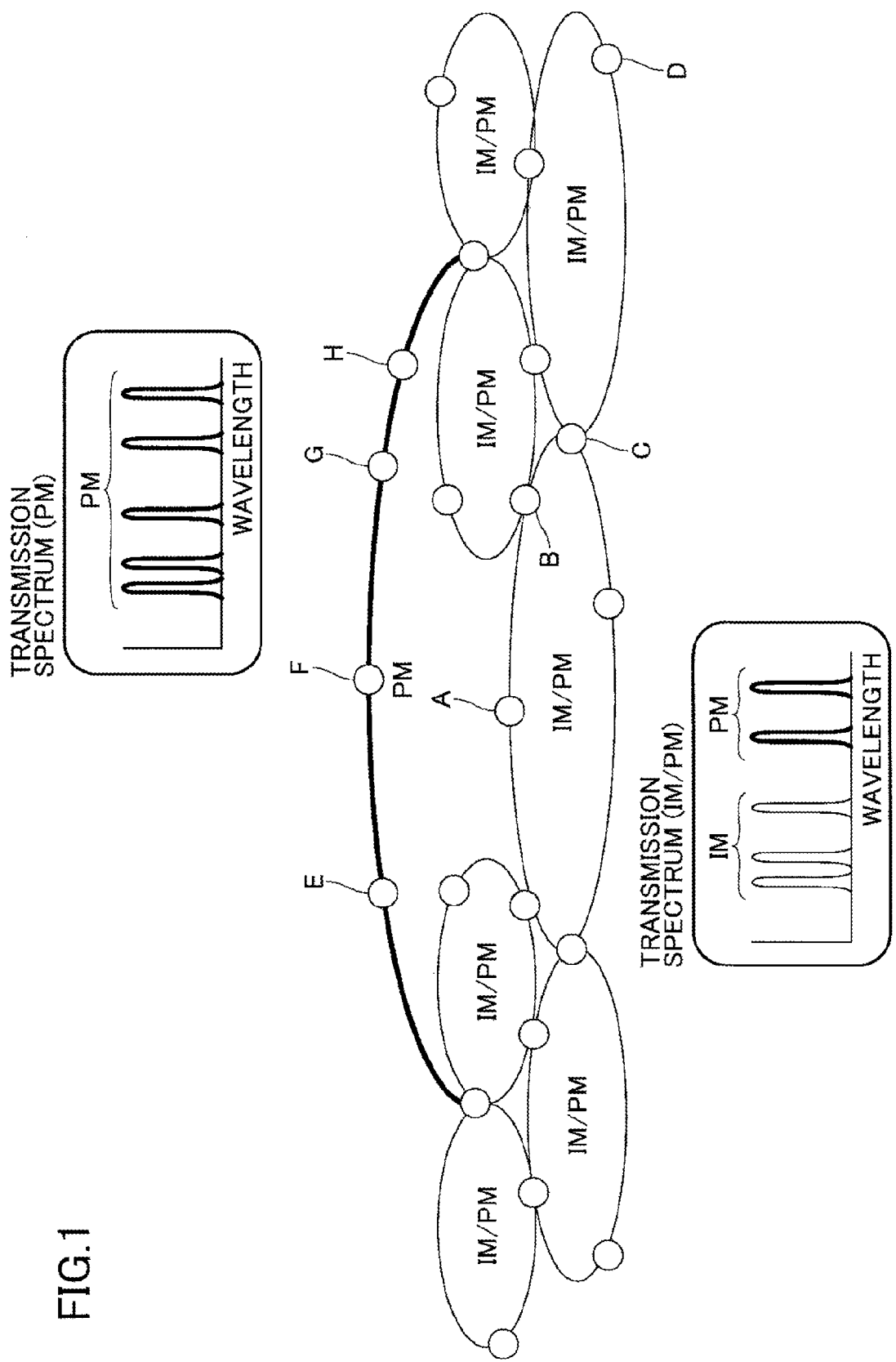
FIG. 1 is a schematic view illustrating an example of a network configuration.

A network configuration will be described to which the disclosures are applied. FIG. 1 is a schematic view illustrating an example of a network configuration. Circles in FIG. 1 designate transmission apparatuses, thick lines or thin lines designate transmission lines connecting adjacent transmission apparatuses.

In the network illustrated in FIG. 1, transmission lines designated by thick lines use only PM, and other transmission lines designated by thin lines use both IM and PM. On a transmission line designated by a thick line, as illustrated in a frame for transmission spectrums (PM), only a transmission spectrum modulated by PM is transmitted. In the following, a transmission line, a transmission apparatus, and the like using only PM may be referred as a PM transmission line, a PM transmission apparatus, and the like. Also, in the transmission line designated by a thin line, as illustrated in a frame for transmission spectrums (IM/PM), a transmission spectrum modulated by IM and a transmission spectrum modulated by PM coexist and are transmitted. In the following, a transmission line, a transmission apparatus, and the like using both IM and PM may be referred as an IM/PM transmission line, an IM/PM transmission apparatus, and the like.

In IM/PM, deterioration of signal quality caused by Cross Phase Modulation (XPM), which will be described later, transmission distance is restricted to about 600 km. On the other hand, in PM, there is no influence of XPM, hence a longer distant transmission is possible than in IM/PM, and about a 3000-km distant transmission can be implemented.

Figure 2A:
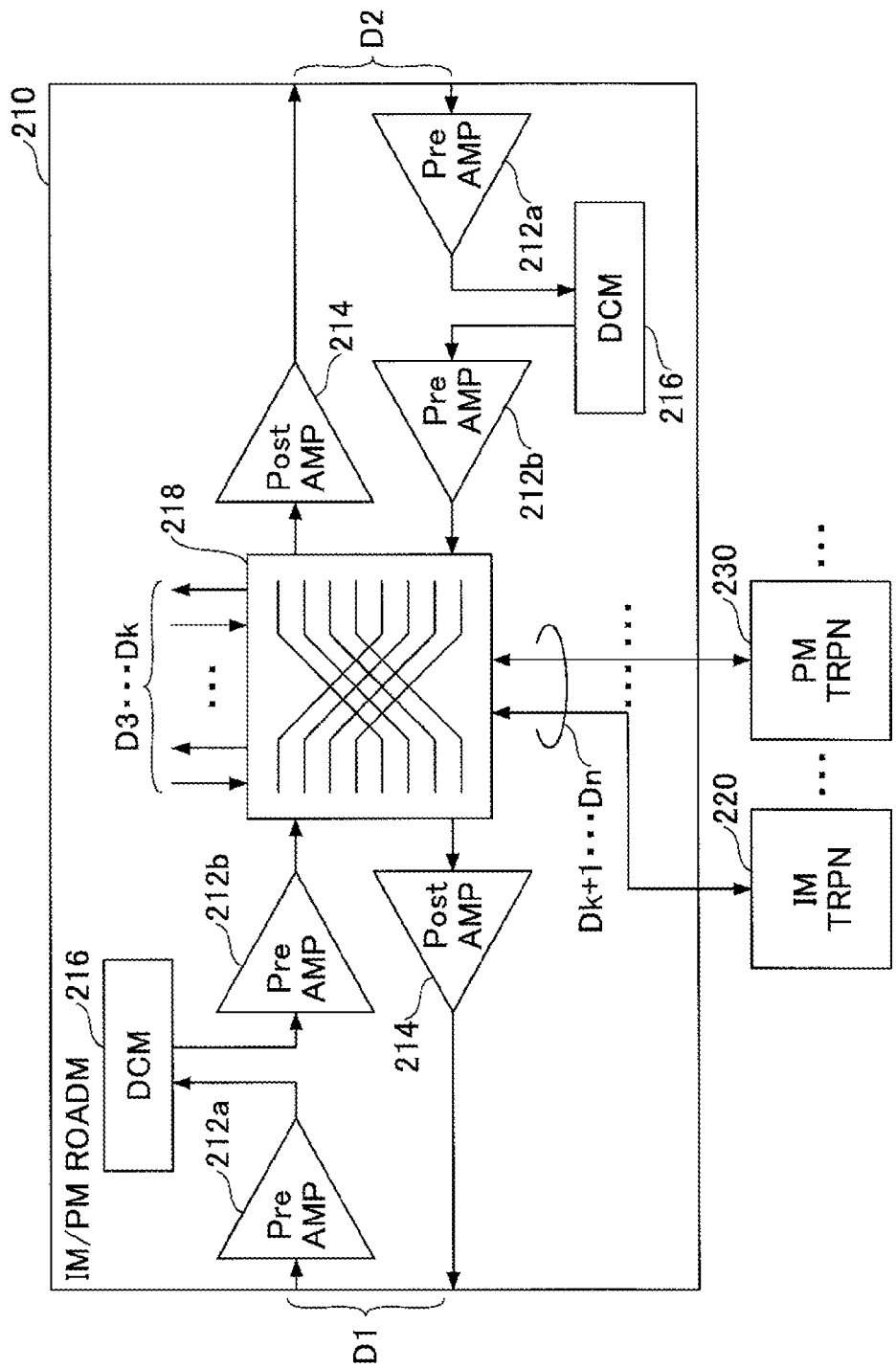
FIG. 2A is a schematic view illustrating a configuration example of an IM/PM transmission apparatus.

FIG. 2A is a schematic view illustrating a configuration example of an IM/PM transmission apparatus. A transmission apparatus illustrated in FIG. 2A corresponds to a transmission apparatus connected with thin transmission lines in FIG. 1. FIG. 2A includes an IM/PM ROADM (Reconfigurable Optical Add/Drop Multiplexer) 210, an IM transponder (IM TRPN) 220, and a PM transponder (PM TRPN) 230.

The IM/PM ROADM 210 includes pre-amplifiers (PreAMPs) 212a and 212b, post-amplifiers (PostAMPs) 214, and Dispersion Compensation Modules (DCMs) 216 for each of directional paths $D_1$ to $D_n$. These configuration elements are illustrated only for the directional paths $D_1$ and $D_2$ for the sake of simplicity. The IM/PM ROADM 210 further includes an add/drop switch 218.

In IM, the IM TRPN 220 does not have a wavelength dispersion function. Therefore, the DCM 216 is provided in the IM/PM ROADM 210 to compensate wavelength dispersion before an optical signal is input to the IM TRPN 220.

In the example illustrated in FIG. 2A, an optical signal received from the directional path $D_1$ is amplified by the pre-amplifier 212a, compensated for wavelength dispersion by the DCM 216, further amplified by the pre-amplifier 212b, then output to either one of the directional paths $D_1$ to $D_n$ selected by the add/drop switch 218. In the example illustrated in FIG. 2A, an optical signal output to the directional path $D_2$ is amplified by the post-amplifier 214, then transmitted to another transmission apparatus via a transmission line. Also, in this example, a part of optical signals output to the directional paths $D_{k+1}$ to $D_n$ are input to the IM TRPN 220, and another part are input to the PM TRPN 230.

FIG. 2B is a schematic view illustrating a configuration example of a PM transmission apparatus. A transmission apparatus illustrated in FIG. 2B corresponds to a transmission apparatus connected with the thick transmission lines in FIG. 1. FIG. 2B includes a PM ROADM 240 and a PM TRPN 230.

The PM ROADM 240 includes pre-amplifiers (PreAMPs) 242 and post-amplifiers (PostAMPs) 244 for each of directional paths $D_1$ to $D_n$. These configuration elements are illustrated only for the directional paths $D_1$ and $D_2$ for the sake of simplicity. The IM/PM ROADM 240 further includes an add/drop switch 248.

The PM ROADM 240 does not include a DCM, which differs from the IM/PM ROADM 210. This is because in PM, a digital coherent optical receiver in the PM TRPN 230 provides a wavelength-distortion-compensation function, whereas in IM, the DCM 216 in the IM/PM ROADM 210 provides a wavelength-distortion-compensation function.

In the example illustrated in FIG. 2B, an optical signal received from the directional path $D_1$ is amplified by the pre-amplifier 242, then output to either one of the directional paths $D_1$ to $D_n$ selected by the add/drop switch 248. In the example illustrated in FIG. 2B, an optical signal output to the directional path $D_2$ is amplified by the post-amplifier 244, then transmitted to another transmission apparatus via a transmission line. Also, in this example, all optical signals output to the directional paths $D_{k+1}$ to $D_n$ are input to the PM TRPN 230.

<Digital Coherent Optical Receiver>

Next, referring to FIG. 3, a configuration of the PM TRPN 230 illustrated in FIG. 2B will be described.

Figure 3:
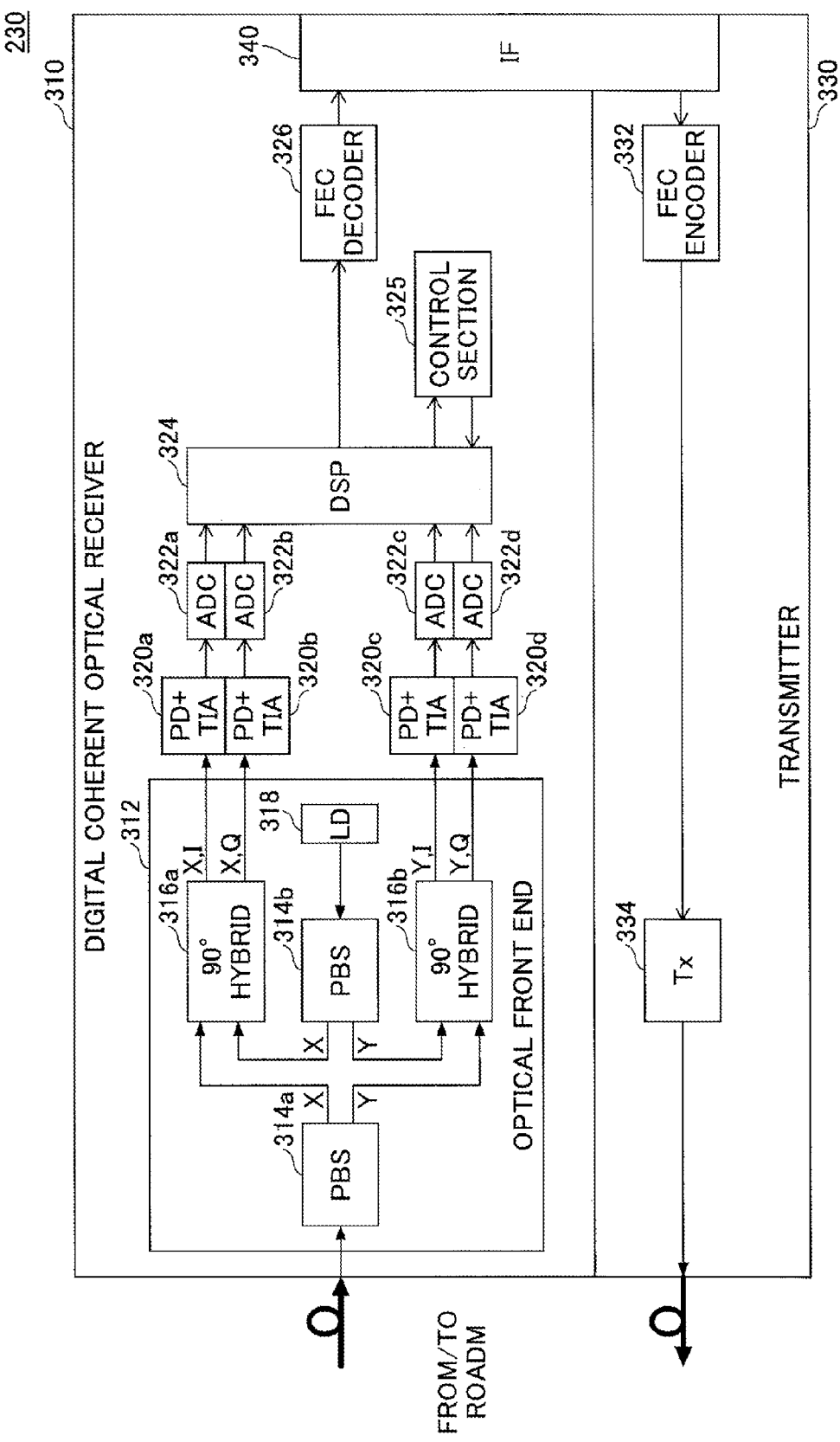
FIG. 3 is a block diagram of a PM TRPN.

The PM TRPN 230 illustrated in FIG. 3 receives an optical signal that is polarization multiplexed, and multi-valued (M values) PSK modulated. In the following, a case where M=4, or QPSK (Quadrature Phase Shift Keying) modulation is taken as an example for explanation. Here, M may take values other than 4 such as 8, 16, or 32. Also, non-polarization multiplexed PSK modulation may be allowed.

The PM TRPN 230 is implemented with a digital coherent optical transceiver illustrated in FIG. 3. The PM TRPN 230 includes a digital coherent optical receiver 310, a transmitter 330, and an interface 340 to be connected with a communication device such as a router.

The digital coherent optical receiver 310 receives an optical signal from the IM/PM ROADM 210 illustrated in FIG. 2A or the PM ROADM 240 illustrated in FIG. 2B, to transfer the signal to a communication device such as a router via the interface 340.

The digital coherent optical receiver 310 includes polarization beam splitters (PBSs) 314a and 314b; an optical front end 312 including 90-degree hybrids 316a and 316b and a local light source (Laser Diode, or LD) 318; light-electricity conversion sections (Photodiode and Transimpedance Amplifier, or PD+TIA) 320a-320d; Analog-to-Digital Convertors (ADCs) 322a-322d; a Digital Signal Processor (DSP) 324; a control section 325; and a Forward Error Correction (FEC) decoder 326.

In FIG. 3, an optical signal received from the IM/PM ROADM 210 or the PM ROADM 240 is separated into two orthogonal polarization components, namely, an X-polarization component and a Y-polarization component, by the polarization beam splitter 314a. The X-polarization component is supplied to the 90-degree hybrid 316a and the Y-polarization component is supplied to the 90-degree hybrid 316b. Also, local light output by the local light source 318 is bifurcated by the polarization beam splitter 314b, one of which is supplied to the 90-degree hybrid 316a and the other is supplied to the 90-degree hybrid 316b.

The 90-degree hybrid 316a obtains a pair of output light components in which the X-polarization component and the local light are interfered with each other in in-phase and reversed phase, and another pair of output light components in which the same components are interfered with each other in orthogonality (+90 degrees) and reverse-orthogonality (−90 degrees), which are supplied to the light-electricity conversion sections 320a and 320b, respectively.

The light-electricity conversion sections 320a and 320b include balance-type photo diodes and amplifiers. The light-electricity conversion section 320a receives the light interfered in in-phase and reversed phase by differential reception, amplifies an electrical signal corresponding to the interfered in-phase component (I) of the X-polarization component and the local light so that the electrical signal reaches operation ranges of the ADCs 322a and 322b at the next stage, then outputs the signal. The light-electricity conversion section 320b receives the light interfered in orthogonality and reverse-orthogonality by differential reception, amplifies an electrical signal corresponding to the interfered orthogonal component (Q) of the X-polarization component and the local light so that the electrical signal reaches the operation ranges of the ADCs 322a and 322b at the next stage, then outputs the signal.

The 90-degree hybrid 316b obtains a pair of output light components in which the Y-polarization component and the local light are interfered with each other in in-phase and reversed phase, and another pair of output light components in which the same components are interfered with each other in orthogonality (+90 degrees) and reverse-orthogonality (−90 degrees), which are supplied to the light-electricity conversion sections 320c and 320d, respectively.

The light-electricity conversion sections 320c and 320d include balance-type photo diodes and amplifiers. The light-electricity conversion section 320c receives the light interfered in in-phase and reversed phase by differential reception, amplifies an electrical signal corresponding to the interfered in-phase component (I) of the Y-polarization component and the local light so that the electrical signal reaches operation ranges of the ADCs 322c and 322d at the next stage, then outputs the signal. The light-electricity conversion section 320d receives the light interfered in orthogonality and reverse-orthogonality by differential reception, amplifies an electrical signal corresponding to the interfered orthogonal component (Q) of the Y-polarization component and the local light so that the electrical signal reaches the operation ranges of the ADCs 322c and 322d at the next stage, then outputs the signal.

The above I/Q components of the X polarization and the I/Q components of the Y polarization are phase signals of the two polarization components separated by coherent reception. These phase signals are supplied to the ADCs 322a-322d to be converted into phase data.

The electrical signals digitized by the ADCs 322a-322d are applied with signal processing at the DSP 324, which will be described later, decoded at the FEC decoder 326, then transferred to another communication device via the IF 340.

The control section 325 determines the modulation scheme of the transmission line based on a wavelength dispersion value indicated by the DSP 324, selects a moving average frequency to be executed, which is indicated to the DSP 324. Alternatively, the control section 325 may be included in the DSP 324.

The transmitter 330 receives a signal from another communication device via the IF 340, encodes the signal at the FEC encoder 332, then transmits the signal light to the IM/PM ROADM 210 (FIG. 2A) or the PM ROADM 240 (FIG. 2B) by a Transmission (Tx) section 334.

Figure 4:
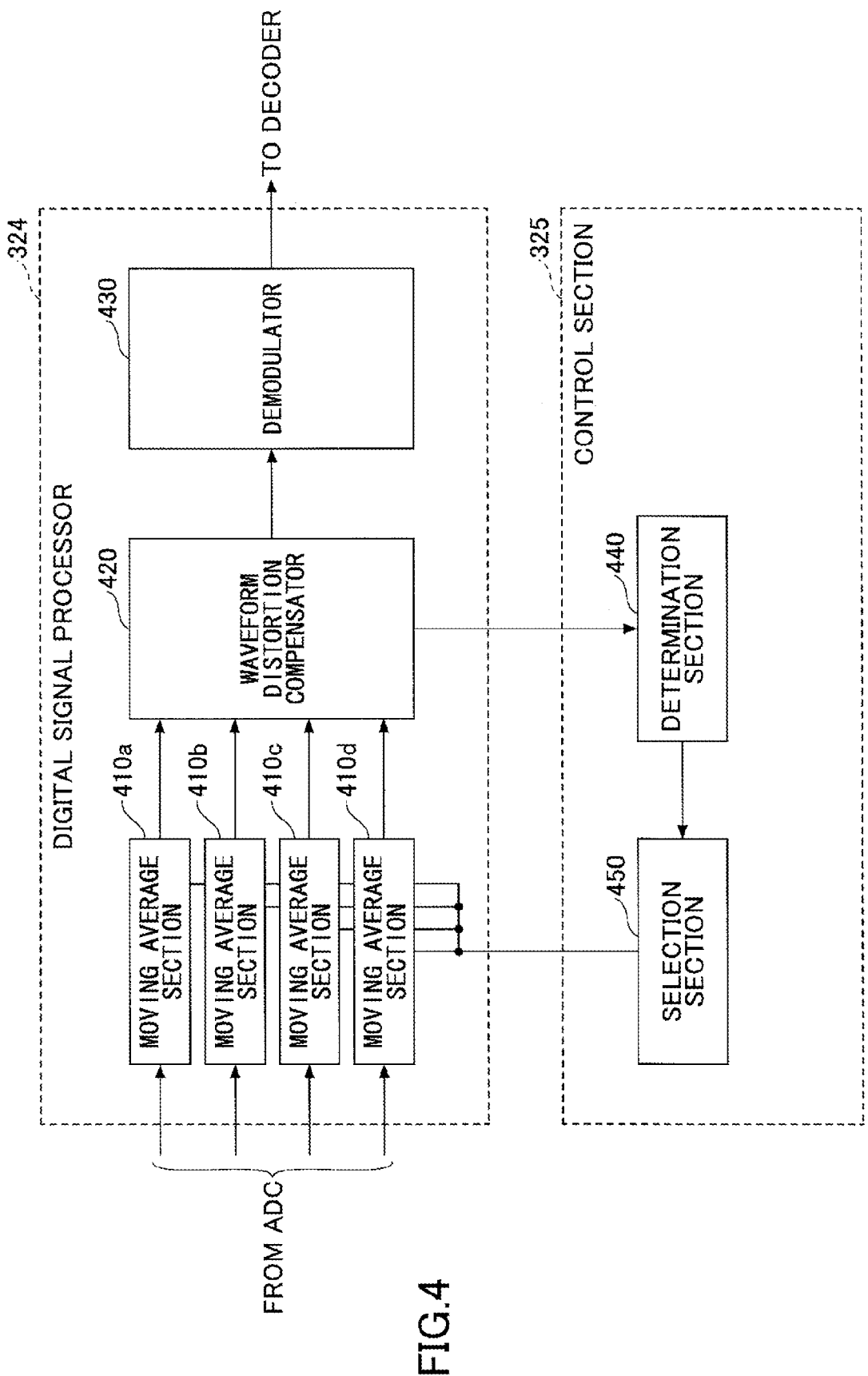
FIG. 4 is a block diagram of a DSP and a control section of a digital coherent optical receiver.

FIG. 4 is a block diagram of the DSP 324 and the control section 325 of the digital coherent optical receiver 310.

The DSP 324 includes moving average sections 410a-410d, a waveform distortion compensator 420, and a demodulator 430.

The moving average sections 410a-410d receive the digitized electrical signals output by the ADCs 322a-322d, respectively, then execute a moving average to these signals with a frequency directed by the control section 325 to smooth the signals.

The waveform distortion compensator 420 receives the signals output by the moving average sections 410, detects the wavelength dispersion value, then executes wavelength dispersion compensation. The compensated wavelength dispersion value is transferred to the control section 325. The waveform distortion compensator 420 may further execute various compensation such as phase shift compensation, adaptive-equalization-type waveform distortion compensation, polarization mode dispersion compensation, and the like.

The demodulator 430 receives the digital signal compensated for waveform distortion, then executes demodulation processing. The demodulator 430 may include the FEC decoder 326 in FIG. 3.

The control section 325 includes a determination section 440 and a selection section 450.

The determination section 440 receives the compensated wavelength dispersion value from the waveform distortion compensator 420 of the DSP 324. Based on the wavelength dispersion value, the determination section 440 determines the modulation scheme, as will be described later, to indicate the scheme to the selection section 450.

Based on the modulation scheme indicated by the determination section 440, namely IM/PM or PM, the selection section 450 selects a moving average frequency associated with each of the modulation schemes. Multiple moving average frequencies associated with each of the modulation schemes may be set in the selection section 450 beforehand, or stored in a separate memory.

The selection section 450 indicates the selected moving average frequencies to the moving average sections 410a-410d of the DSP 324.

Alternatively, the determination section 440 and the selection section 450 may be integrated so that, for example, a moving average frequency is selected that is associated with a range of the wavelength dispersion value, based on a comparison result between the wavelength dispersion value and a threshold value. In this case, determination of modulation scheme may be omitted.

<Moving Average Frequency>

Figure 5:
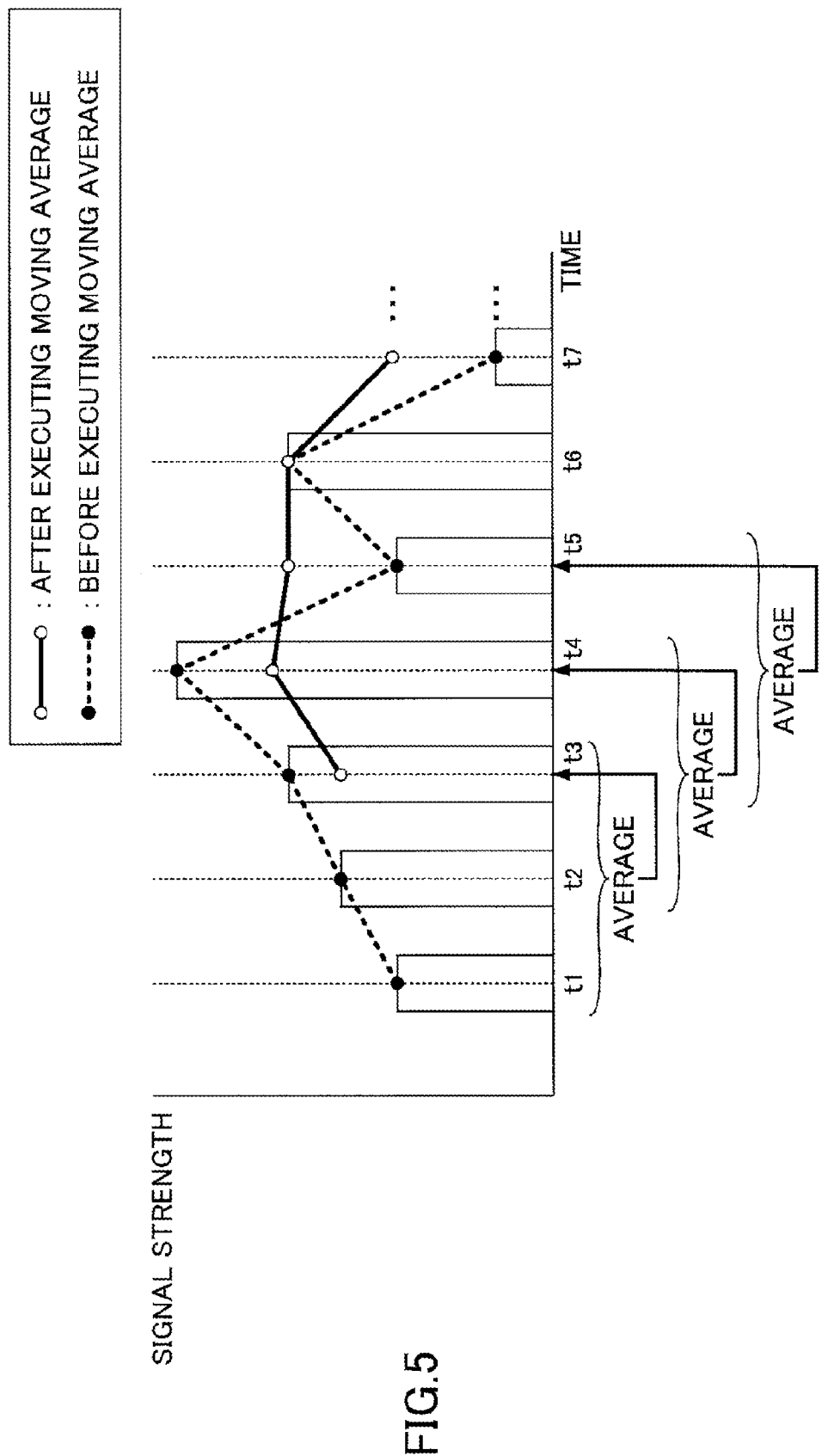
FIG. 5 is a schematic view illustrating a moving average.

Referring to FIG. 5, moving average will be described, which is executed in the moving average sections 410a-410d in FIG. 4. In FIG. 5, the vertical axis represents signal strength and the horizontal axis represents time. In FIG. 5, a dashed line corresponds to signal strength of the phase data before execution of a moving average, namely, input values from the ADCs 322a-322d, and a solid line corresponds to signal strength of the phase data after execution of a moving average, namely, output values of the moving average sections 410a-410d.

In the example of FIG. 5, the moving average frequency is set to three. Each of the moving average sections 410a-410d calculates the average of the input values taken from the corresponding one of the ADCs 322a-322d received at times $t_1$, $t_2$, and $t_3$, to output the average to the waveform distortion compensator 420 at the next stage. Next, each of the moving average sections 410a-410d calculates the average of the input values taken from the corresponding one of the ADCs 322a-322d received at times $t_2$, $t_3$, and $t_4$, to output the average to the waveform distortion compensator 420 at the next stage. Similarly, at following times, the average of the input values is calculated from the received three input values, to be output to the next stage. In this way, each of the moving average sections 410a-410d smoothes the digital signal output from the corresponding one of the ADC 322a-322d to transfer the signal to the next stage. Here, average calculation is applied three times per one sample output from one of the ADCs 322a-322d. Times/sample is the unit of the moving average frequency.

The above moving average is effective because random noise components (for example, Amplified Spontaneous Emission, or ASE) can be removed, which could be superposed with an optical signal propagating through a transmission line by an In-Line Amplifier (ILA) or the like.

The upper limit of the moving average frequency depends on modulation speed and other specifications for signal processing of a receiver.

The moving average frequency also depends on the modulation scheme used in a transmission line, which will be described as follows.

<Moving Average Frequency With IM/PM>

In an IM/PM transmission line, a change of refractive index is generated in an optical transmission line (optical fiber) mainly due to a nonlinear optical effect when signal strength changes with IM. Consequently, Cross Phase Modulation (XPM) is generated that causes a phase shift in a PM signal, resulting in a considerable deterioration of transmission quality. XPM will be described with reference to FIGS. 6A-6E.

FIGS. 6A-6E are schematics view illustrating XPM. Referring to FIGS. 6A-6E, signal strength in an IM/PM transmission line will be described. Suppose that IM transmission spectrums B, C, and E, and PM transmission spectrums G and H coexist in the same optical transmission line, as illustrated in FIG. 6A. FIGS. 6B-6E illustrate examples of changes over time in signal strength of the transmission spectrums B, C, E, and G, respectively. The transmission spectrum H is substantially the same as the transmission spectrum G, which is omitted here.

As illustrated in FIG. 6B, the signal strength of the IM transmission spectrum B changes from a weak state to a strong state (or off to on) between time $t_1$ and $t_2$. Also as illustrated in FIG. 6C, the signal strength of the IM transmission spectrum C changes from a strong state to a weak state (or on to off) between time $t_5$ and $t_6$. In addition, as illustrated in FIG. 6D, the signal strength of the IM transmission spectrum D changes from a weak state to a strong state (or off to on) between time $t_3$ and $t_4$.

On the other hand, as illustrated in FIG. 6E, the signal strength of the PM transmission spectrum G remains unchanged during one symbol length ($t_A$ to $t_B$). During the one symbol length ($t_A$ to $t_B$), the transmission spectrum G needs to hold the same phase to transmit the same data.

As illustrated in above FIGS. 6B-6D, while the strength changes are occurring in the IM transmission spectrums B, C, and E (time $t_1$ to $t_2$, $t_5$ to $t_6$, and $t_3$ to $t_4$), the refractive index of the same transmission line is changed, which causes frequent changes in phase of the transmission spectrum G. These durations (time $t_1$ to $t_2$, $t_5$ to $t_6$, and $t_3$ to $t_4$) in which phase changes occur are designated with hatchings in FIG. 6E. As a result of these phase changes during the one symbol length of the transmission spectrum G, a phase that should be received with PM originally may be lost. The PM transmission spectrum H is also influenced in the same way.

If a moving average is executed to a signal having phase shift generated by such an influence of XPM, transmission quality is further deteriorated because a phase becomes indistinguishable between a phase transmitting information to be transferred and a shifted phase generated by XPM.

Therefore, on an IM/PM transmission line, in principle, it is desirable that the moving average frequency be set to one time/sample.

However, in an actual transmission system, there are cases in which ASE is inserted on an IM/PM transmission line using ILAs or the like to relay a signal at multiple stages. In this case, there may be a case in which moving average execution with a frequency of more than one time/sample is desirable if deterioration of transmission quality due to moving average execution and deterioration of transmission quality due to ASE inserted by ILAs or the like are taken into consideration.

<Moving Average Frequency With PM>

On the other hand, on a PM transmission line, XPM is not generated in principle, which will be described with reference to FIGS. 6F-6G.

Suppose that PM transmission spectrums B, C, E, G, and H exist in the same optical transmission line, as illustrated in FIG. 6F. FIG. 6G illustrates an example of changes over time in signal strength of the transmission spectrum B. The transmission spectrums C, E, G, and H are substantially the same as the transmission spectrum B, which are omitted here.

As illustrated in FIG. 6G, the signal strength of the PM transmission spectrum B remains unchanged during one symbol length ($t_A$ to $t_B$). During the one symbol length ($t_A$ to $t_B$), the transmission spectrum B needs to hold the same phase to transmit the same data. The same requirement is imposed on the other PM transmission spectrums C, E, G, and H.

With PM, it is considered that deterioration of transmission quality does not occur because it is not influenced by a strength change of a transmission spectrum as opposed to with IM. Therefore, when determining a moving average frequency, it is not necessary to take the restriction due to XPM into consideration.

On the other hand, PM is used for a longer distance transmission than IM, hence the number of ILAs inserted along a transmission line is greater. Therefore, with PM, a moving average is extremely effective in removing ASE superposed with multi-stage relaying, and it is desirable to execute a moving average with a frequency as great as possible, for example, with an upper limit mentioned above.

For example, with a representative 100-Gbps DP-DPSK (Dual Polarization-Quadrature Phase Shift Keying) scheme, the upper limit of moving average frequency is 10 to 20 times/sample.

<Summary of Moving Average Frequency>

Figure 7:
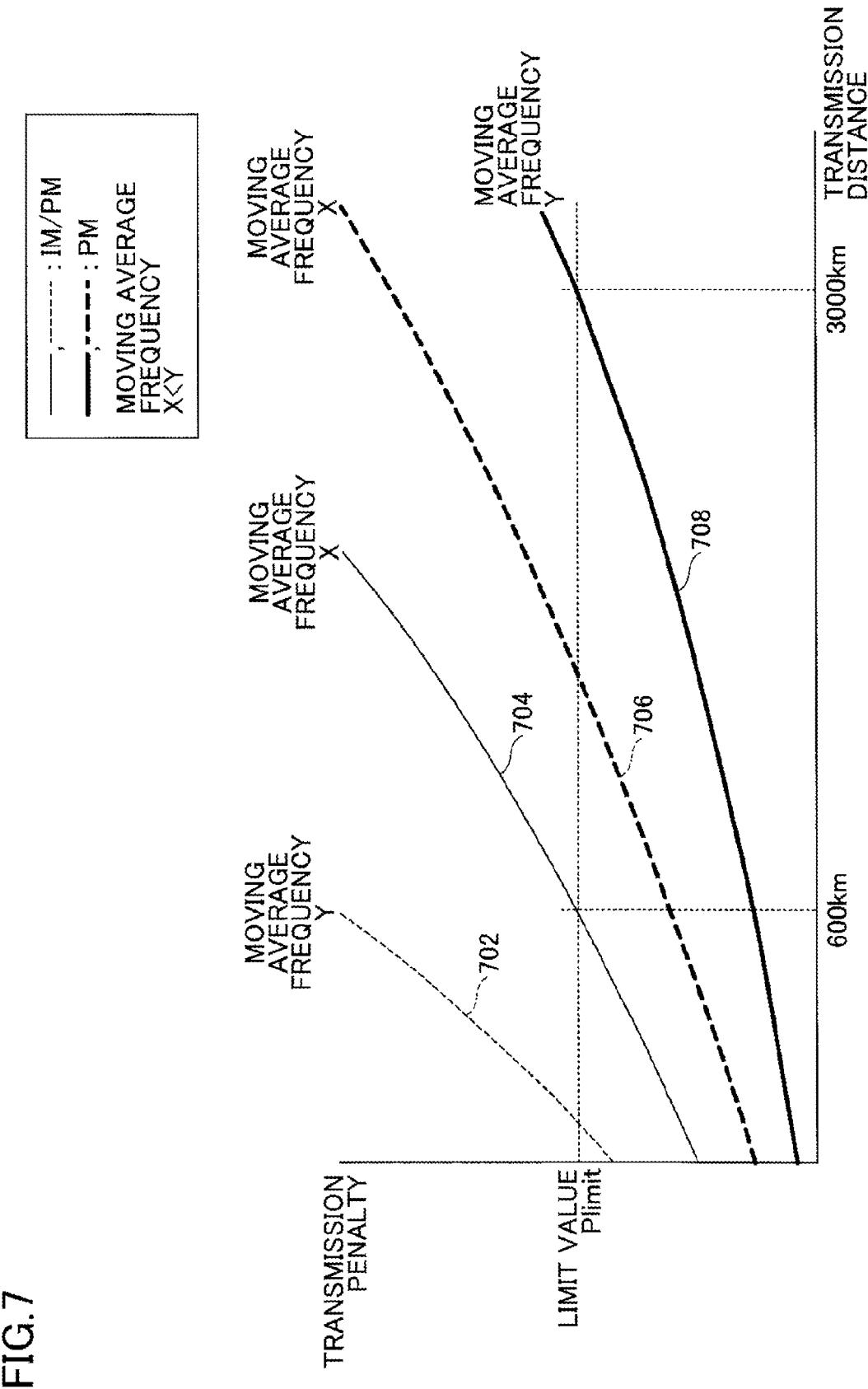
FIG. 7 is a schematic view illustrating a relationship between modulation schemes and desirable moving average frequencies.

FIG. 7 is a schematic view illustrating a relationship between modulation schemes and desirable moving average frequencies. In FIG. 7, the vertical axis represents transmission penalty that designates deterioration of transmission quality, and the horizontal axis represents transmission distance. Transmission distance is set with taking the number of relaying stages, for example, the number of stages of ILAs inserted along a transmission line, into consideration. The longer the transmission distance is, the greater the number of stages of ILAs becomes, through which a signal passes.

In FIG. 7, curves 702 and 704 designate cases in which moving average frequencies are set to Y and X times for an IM/PM transmission line, respectively, and curves 706 and 708 designate cases in which moving average frequencies are set to X and Y times for a PM transmission line, respectively. Here, X and Y are natural numbers and X<Y.

Compared at the same transmission distance, for example, 600 km, the IM/PM curves 702 and 704 have higher transmission penalty than the PM curves 706 and 708.

Focusing on the IM/PM curves 702 and 704, a lower transmission penalty is obtained with a smaller moving average frequency. On the other hand, focusing on the PM curves 706 and 708, a lower transmission penalty is obtained with a greater moving average frequency.

In the examples of FIG. 7, the moving average frequency X is desirable for IM/PM, whereas the moving average frequency Y is desirable for PM. Thus, a desirable moving average frequency differs with modulation schemes used in a transmission line, hence a digital coherent optical receiver needs to switch between two or more frequencies for a moving average for its proper operation.

<Wavelength Dispersion in Transmission Line>

Next, wavelength dispersion in a transmission line will be described. In the DSP 324 of the digital coherent optical receiver illustrated in FIG. 4, various compensation is executed for waveform distortion generated in a transmission line. Such compensation includes wavelength dispersion compensation in which signal degradation is compensated that is caused by wavelength dispersion generated by differences of propagation speeds of light in an optical fiber depending on wavelength. With the wavelength dispersion compensation, a PM digital coherent optical receiver can realize very high dispersion tolerance compared with IM.

The waveform distortion compensator 420 included in the DSP 324 illustrated in FIG. 4 detects a wavelength dispersion value of an input signal, then compensates for it. At this moment, the waveform distortion compensator 420 outputs the detected and compensated wavelength dispersion value for further control.

In the following, wavelength dispersion of a transmission line will be described for IM/PM and for PM.

<Wavelength Dispersion of Transmission Line for IM/PM>

Figure 8:
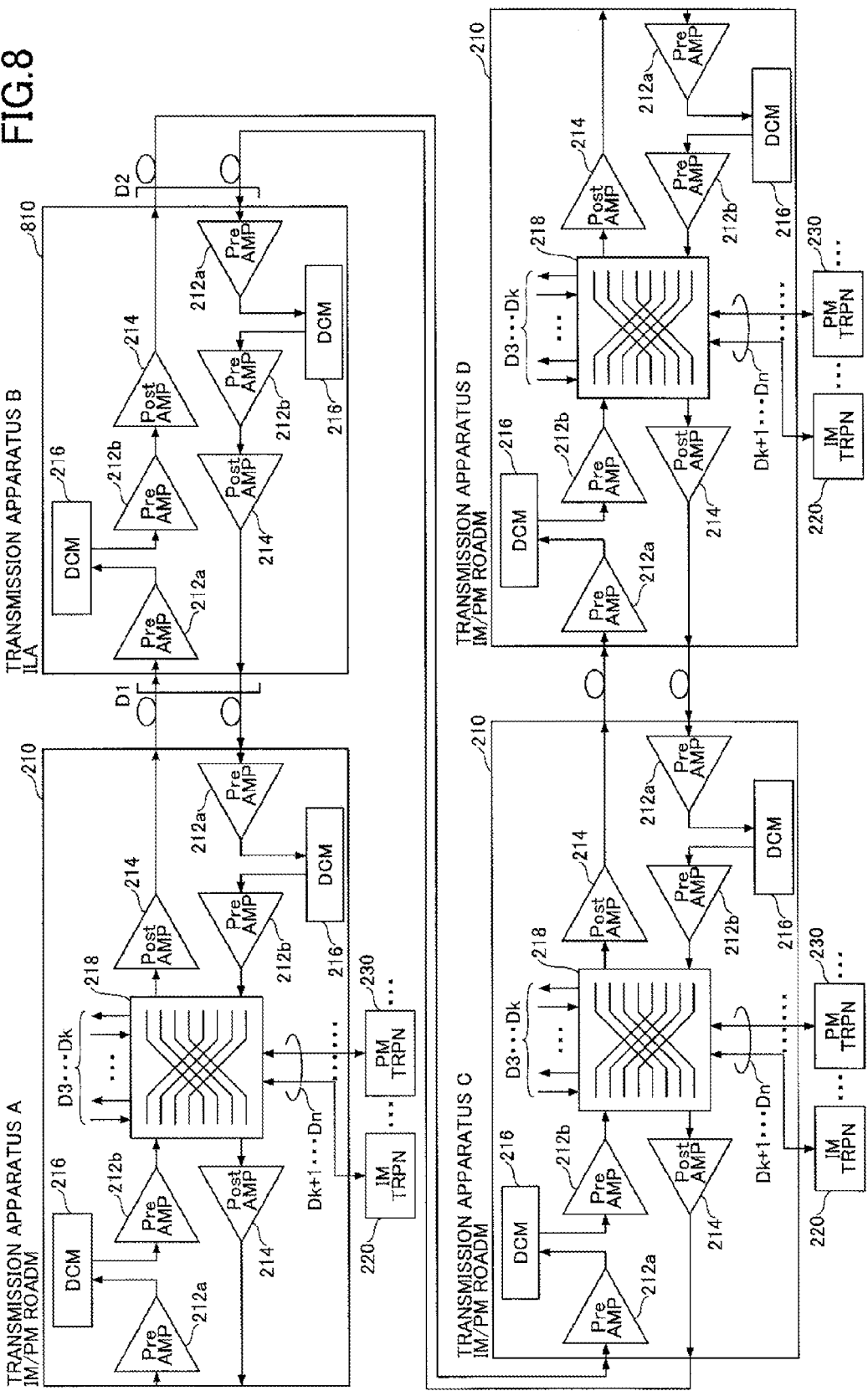
FIG. 8 is a schematic view illustrating a configuration example of an IM/PM transmission line.

FIG. 8 is a schematic view illustrating a configuration example of an IM/PM transmission line. An exemplary transmission line illustrated in FIG. 8 includes transmission apparatuses A-D, which correspond to the transmission apparatuses A-D illustrated in FIG. 1, respectively. The transmission apparatuses A-D are connected by optical fiber. In the transmission line, as illustrated in FIG. 1, IM transmission spectrums and PM transmission spectrums propagate through the same transmission line (optical fiber).

The transmission apparatuses A, C, and D in FIG. 8 have the same configuration as the IM/PM transmission apparatus illustrated in FIG. 2A. Operations of IM/PM ROADMs 210, IM TRPNs 220, and PM TRPNs 230 in FIG. 8 are the same as described above, and their explanation is omitted here.

The transmission apparatus B in FIG. 8 includes an In-Line Amplifier (ILA) 810, which is a relay device. The ILA 810 includes signal pre-amplifiers 212a and 212b for amplifying a signal, post-amplifiers 214, and DCMs 216 for compensating wavelength dispersion. Operations of the elements configuring the ILA 810 are the same as the elements configuring the IM/PM ROADM 210 in FIG. 2A described above, and their explanation is omitted here.

When a signal propagates through the transmission line in FIG. 8, wavelength dispersion is compensated by the DCMs 216 of the transmission apparatuses A-D each time when the signal passes through each of the transmission apparatuses A-D. Therefore, a wavelength dispersion value in the IM/PM transmission line in FIG. 8 behaves as illustrated in FIG. 9.

Figure 9:
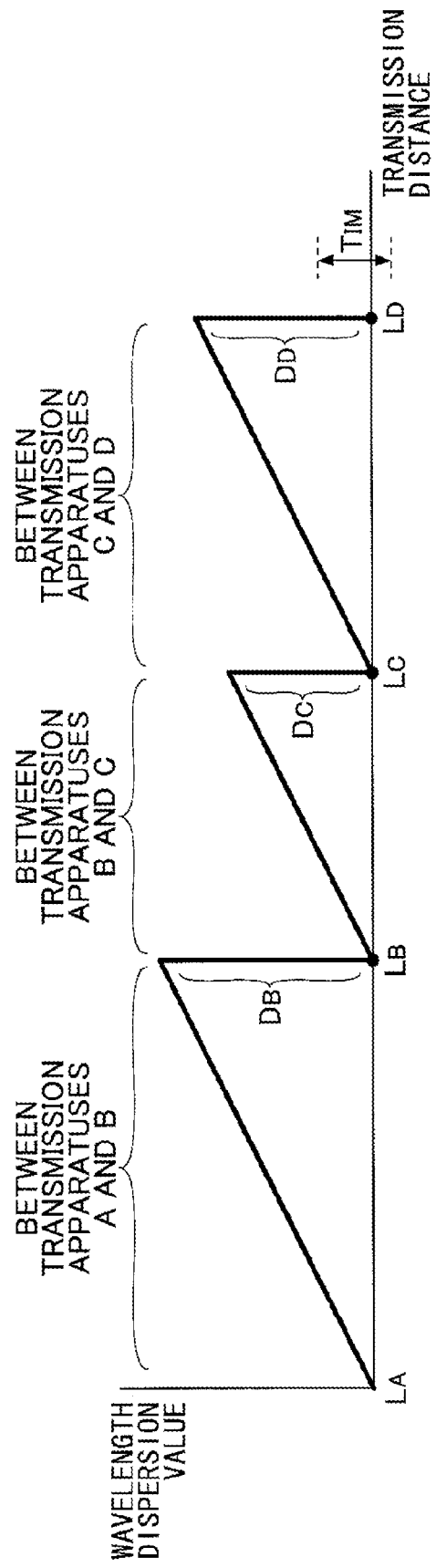
FIG. 9 is a schematic view illustrating a wavelength dispersion value in an IM/PM transmission line.

FIG. 9 is a schematic view illustrating a wavelength dispersion value in an IM/PM transmission line. In FIG. 9, the vertical axis represents wavelength dispersion value (ps/nm), and the horizontal axis represents transmission distance (km). At positions with transmission distances $L_A$, $L_B$, $L_C$, and $L_D$, the transmission apparatuses A, B, C, and D in FIG. 8 exist, respectively.

A signal transmitted from the transmission apparatus A has the wavelength dispersion value of zero because the signal has not yet propagated through the transmission line. Alternatively, the signal may be compensated by the DCM 216 of the transmission apparatus A so that the wavelength dispersion value falls within a range of a dispersion permissible value $T_{IM}$ for an IM transmission apparatus. The signal transmitted from the transmission apparatus A increases its wavelength dispersion value while propagating through the transmission line, until the signal reaches the transmission apparatus B (transmission distance $L_B$). At the transmission apparatus B, wavelength dispersion is compensated again by the DCM 216, hence the wavelength dispersion value is again reduced to a value within the range of the dispersion permissible value $T_{IM}$. Similarly, wavelength dispersion is compensated also at the transmission apparatuses C and D. If passing through further transmission apparatuses, wavelength dispersion is compensated in the same way.

Thus, in the IM/PM transmission line, dispersion compensation is executed by the DCM 216 of the transmission apparatuses, hence the wavelength dispersion value of a signal received at an IM TRPN 220 and a PM TRPN 230 of any one of the transmission apparatuses is within the range of the dispersion permissible value $T_{IM}$ for an IM optical receiver. A dispersion permissible value $T_{IM}$ is, for example, about −200 to +1200 ps/nm for a representative 10-Gbps IM optical receiver while taking various deflections into account. Also, if the DCM 216 compensates 100% of the wavelength dispersion in a transmission line, the wavelength dispersion value of the signal after compensation has an absolute value of about 0 ps/nm.

<Wavelength Dispersion of Transmission Line For PM>

Figure 10:
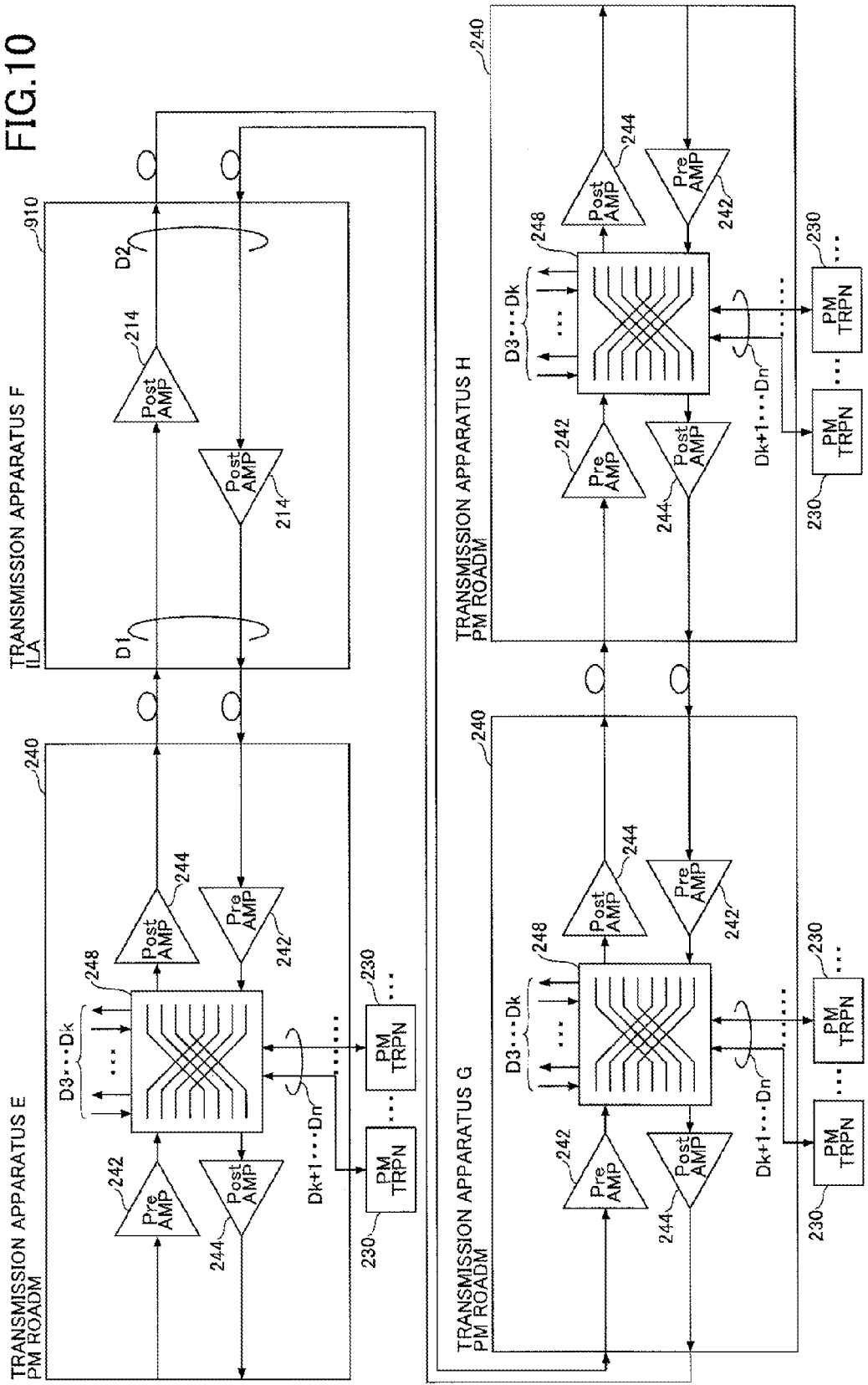
FIG. 10 is a schematic view illustrating a configuration example of a PM transmission line.

FIG. 10 is a schematic view illustrating a configuration example of a PM transmission line. An exemplary transmission line illustrated in FIG. 10 includes transmission apparatuses E-H, which correspond to the transmission apparatuses E-H illustrated in FIG. 1, respectively. The transmission apparatuses are connected by optical fiber. In the transmission line, as illustrated in FIG. 1, only PM transmission spectrums propagate through the same transmission line (optical fiber).

The transmission apparatuses E, G, and H in FIG. 10 have the same configuration as the PM transmission apparatus illustrated in FIG. 2B. Operations of PM ROADMs 240 and PM TRPNs 230 in FIG. 10 are the same as described above, and their explanation is omitted here.

The transmission apparatus F in FIG. 10 includes an In-Line Amplifier (ILA) 910, which is a relay device. The ILA 910 includes post-amplifiers 214 for amplifying a signal. Operations of the elements configuring the ILA 910 are the same as the elements configuring the IM/PM ROADM 210 in FIG. 2A described above, and their explanation is omitted here.

The ILA 910 in FIG. 10 does not have a DCM, which is different from the ILA 810 in FIG. 8. Therefore, when a signal propagates through the transmission line in FIG. 10, wavelength dispersion is not compensated when the signal passes the transmission apparatuses E-H. Therefore, a wavelength dispersion value in a PM transmission line in FIG. 10 behaves as illustrated in FIG. 11.

Figure 11:
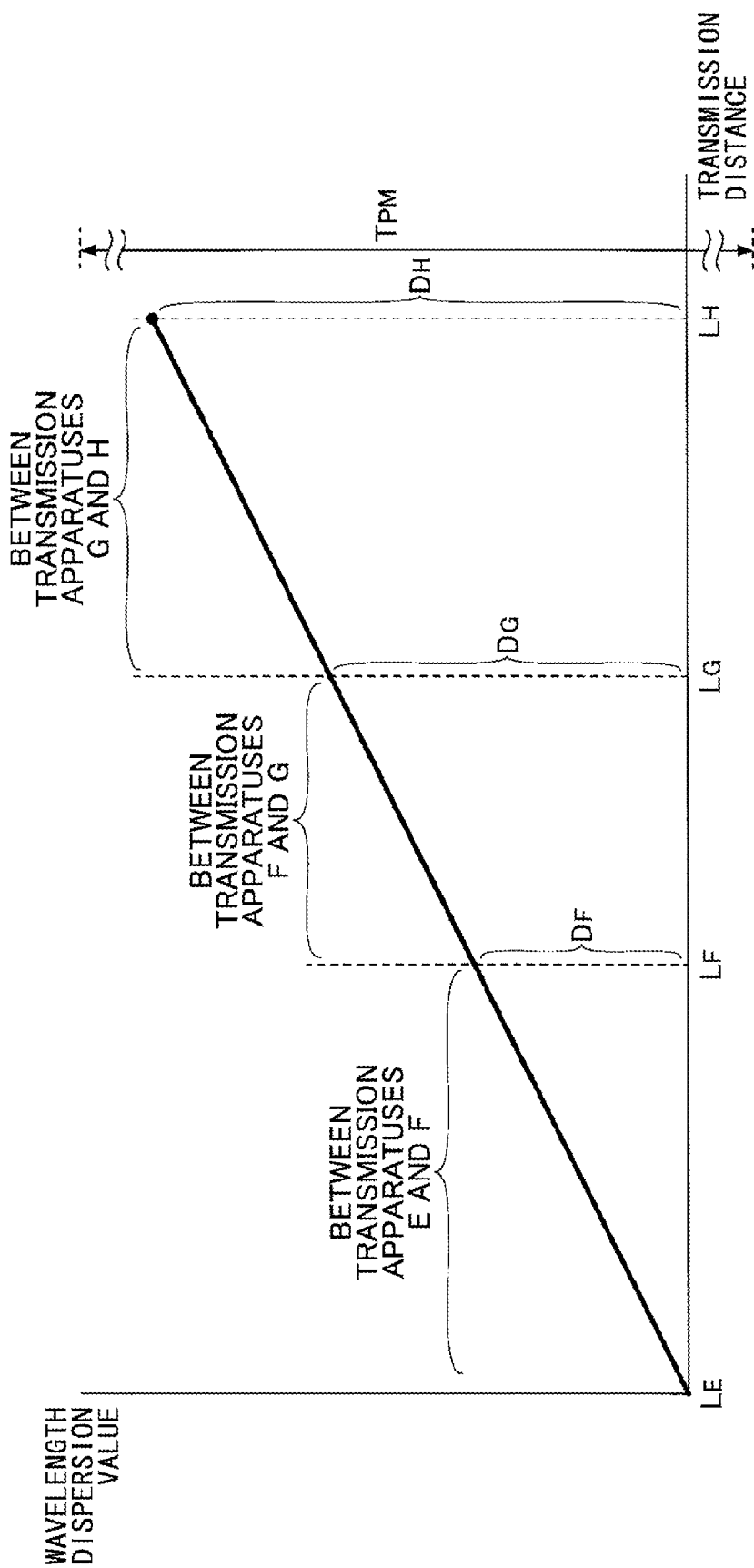
FIG. 11 is a schematic view illustrating a wavelength dispersion value in a PM transmission line.

FIG. 11 is a schematic view illustrating a wavelength dispersion value in a PM transmission line. In FIG. 11, the vertical axis represents wavelength dispersion value (ps/nm), and the horizontal axis represents transmission distance (km). At positions with transmission distances $L_E$, $L_F$, $L_G$, and $L_H$, the transmission apparatuses E, F, G, and H in FIG. 8 exist, respectively.

A signal transmitted from the transmission apparatus E has the wavelength dispersion value of zero because the signal has not yet propagated through the transmission line. The signal transmitted from the transmission apparatus E increases its wavelength dispersion value while propagating through the transmission line, and has a wavelength dispersion value $D_F$ when the signal reaches the transmission apparatus F (transmission distance $L_F$). However, wavelength dispersion is not compensated at the transmission apparatus F, which is different from the case in FIG. 9, hence the wavelength dispersion value is not reduced and further increased while the signal is propagating towards the transmission apparatus G, where the wavelength dispersion value is further increased to $D_G$. Similarly, wavelength dispersion is not compensated by the ROADM 240 of the transmission apparatus G, hence the wavelength dispersion value is further increased while the signal is propagating towards the transmission apparatus H, where the wavelength dispersion value is further increased to $D_H$. If passing through further transmission apparatuses, wavelength dispersion is also not compensated.

Thus, in the PM transmission line, dispersion compensation is not executed at the transmission apparatuses E-H, hence the wavelength dispersion value of a signal received at a PM TRPN 230 of any one of the transmission apparatuses is increased proportionate to the transmission distance.

Here, as described with reference to FIGS. 3-4, the digital coherent optical receiver 310 used in the PM TRPN 230 executes wavelength dispersion compensation internally. Therefore its dispersion permissible value $T_{PM}$ is considerably greater than the dispersion permissible value $T_{IM}$ of an IM optical receiver. A dispersion permissible value $T_{PM}$ of a digital coherent optical receiver is, for example, about −50000 to +50000 ps/nm for a representative 100-Gbps digital coherent optical receiver, which is over 30 times greater than $T_{IM}$ described above.

<Determination of Modulation Scheme Used in Transmission Line>

As described above, change of a wavelength dispersion value of a signal propagating through a transmission line with respect to the transmission distance differs with an IM/PM transmission line or a PM transmission line. Therefore, at a digital coherent optical receiver 310, the modulation scheme of a transmission line can be determined based on the wavelength dispersion value of a received signal.

Figure 12:
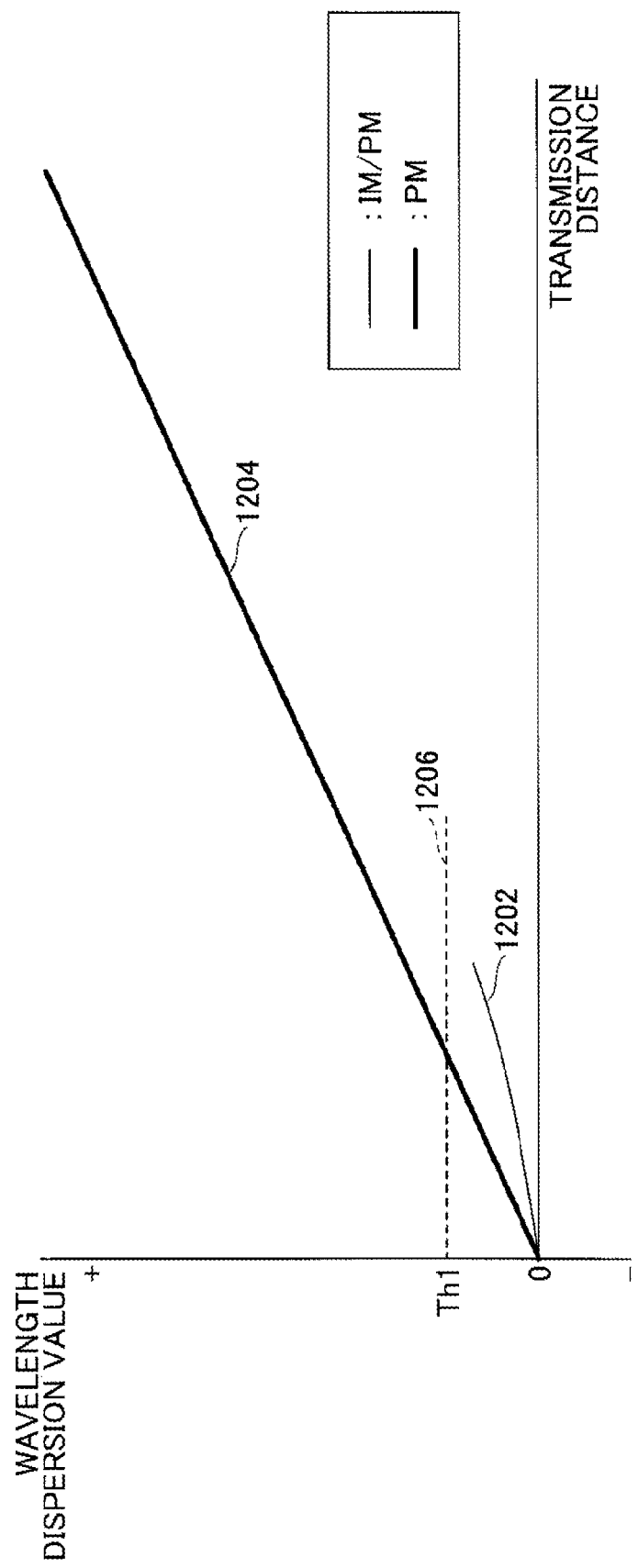
FIG. 12 is a schematic view illustrating an embodiment using one threshold value.

FIG. 12 is a schematic view illustrating an embodiment using one threshold value. In FIG. 12, the vertical axis represents wavelength dispersion value (ps/nm), and the horizontal axis represents transmission distance (km).

A line 1202 represents an IM/PM wavelength dispersion value. As described with reference to FIG. 9, the wavelength dispersion value does not change much even if the transmission distance increases.

A line 1204 represents a PM wavelength dispersion value. As described with reference to FIG. 11, the wavelength dispersion value increases proportionate to the transmission distance.

As a wavelength dispersion value, the wavelength dispersion value detected and compensated by the above waveform distortion compensator 420 in the digital coherent optical receiver 310 is used. The digital coherent optical receiver 310 compares the wavelength dispersion value with a threshold value ($Th_1$) 1206, to determine that it is PM if the wavelength dispersion value is greater than $Th_1$, or it is IM/PM if the wavelength dispersion value is less than or equal to $Th_1$.

The threshold value ($Th_1$) 1206 is also called the first threshold value.

As a threshold value ($Th_1$) 1206, for example, the upper limit of the dispersion permissible value $T_{IM}$ for an IM optical receiver may be used. In the above example relate to FIG. 9, the upper limit of the dispersion permissible value $T_{IM}$ is +1200 ps/nm for a representative 10-Gbps IM optical receiver. Also, if the DCM 216 compensates 100% of the wavelength dispersion in a transmission line, 0 ps/nm may be used as the threshold value.

Figure 13:
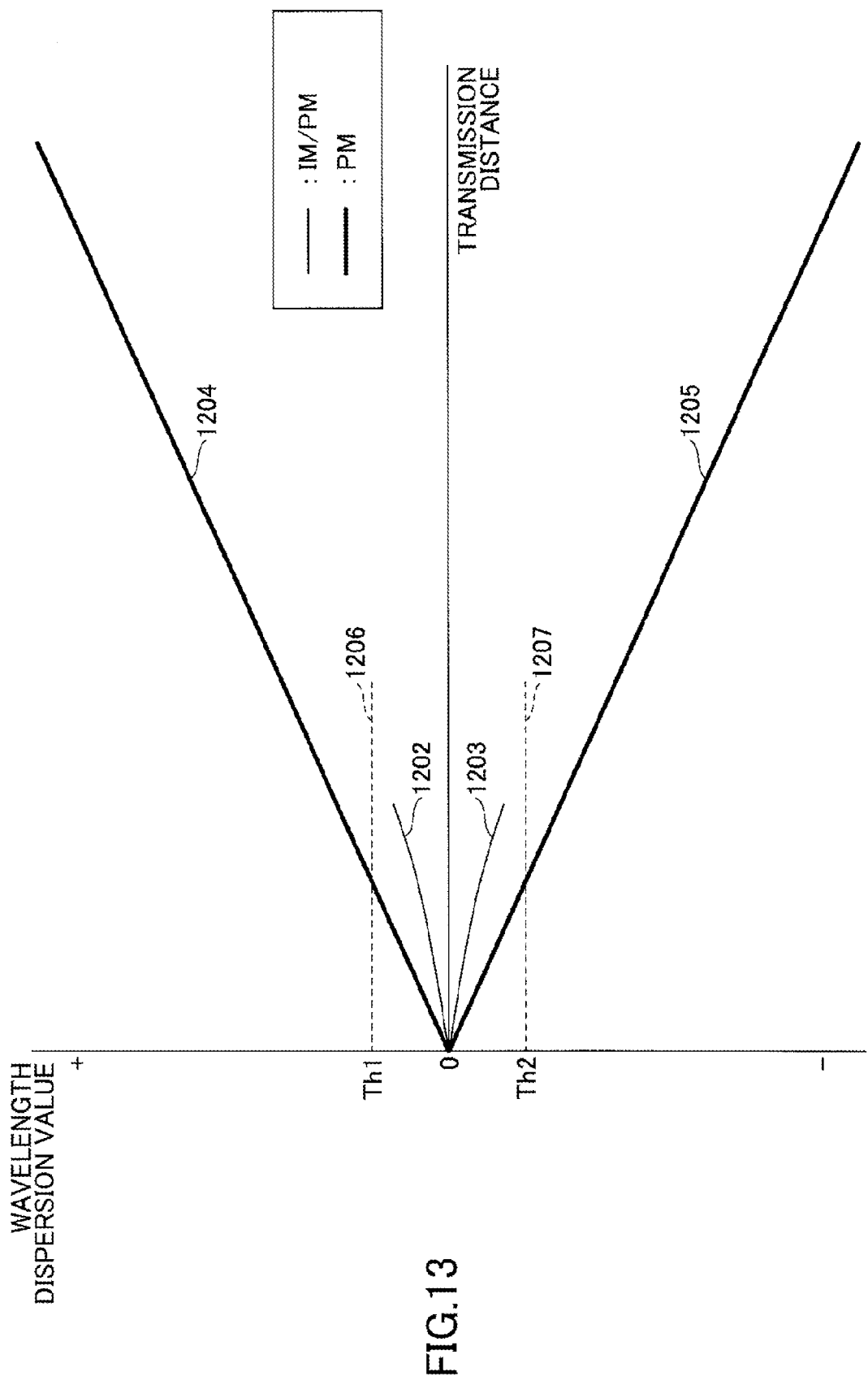
FIG. 13 is a schematic view illustrating an embodiment using two threshold values.

Alternatively, two threshold values may be used. FIG. 13 is a schematic view illustrating an embodiment using two threshold values. In FIG. 13, the vertical axis represents wavelength dispersion value (ps/nm), and the horizontal axis represents transmission distance (km). In FIG. 13, in addition to a positive-valued wavelength dispersion value illustrated in FIG. 12, a negative-valued wavelength dispersion value is also taken into account.

Lines 1202 and 1203 represent IM/PM wavelength dispersion values. As described with reference to FIG. 9, the wavelength dispersion value does not change much even if the transmission distance increases.

Lines 1204 and 1205 represent PM wavelength dispersion values. As described with reference to FIG. 11, the wavelength dispersion value increases proportionate to the transmission distance.

As a wavelength dispersion value, the wavelength dispersion value detected and compensated by the above waveform distortion compensator 420 in the digital coherent optical receiver 310 may be used. The digital coherent optical receiver 310 compares the wavelength dispersion value with two threshold values ($Th_1$ and $Th_2$) 1206 and 1207, to determine that it is PM if the wavelength dispersion value is greater than $Th_1$ or less than $Th_2$, or it is IM/PM if the wavelength dispersion value is less than or equal to $Th_1$ and greater than or equal to $Th_2$.

The threshold values ($Th_1$ and $Th_2$) 1206 and 1207 are also called the first and the second threshold values.

As threshold values ($Th_1$ and $Th_2$) 1206 and 1207, for example, the upper and lower limits of the dispersion permissible value $T_{IM}$ for an IM optical receiver may be used. In the above example relate to FIG. 9, the upper limit of the dispersion permissible value $T_{IM}$ is +1200 ps/nm, and the lower limit is −200 ps/nm for a representative 10-Gbps IM optical receiver.

Alternatively, as threshold values ($Th_1$ and $Th_2$) 1206 and 1207, the upper limit and the sign-inverted upper limit value of the dispersion permissible value $T_{IM}$ for an IM optical receiver, or the sign-inverted lower limit value and the lower limit may be used. For the above example, these are +1200 ps/nm and −1200 ps/nm, or +200 ps/nm and −200 ps/nm.

<Selection of Moving Average Frequency>

Similar to the above determination of modulation scheme based on a wavelength dispersion value, it is possible to select a moving average frequency that is to be executed by a digital coherent optical receiver based on the wavelength dispersion value of a received signal.

As described above, a desirable moving average frequency differs with modulation schemes used in a transmission line, hence a digital coherent optical receiver needs to switch between more than one moving average frequency for its operation.

Referring to the example in FIG. 12 again, an embodiment using one threshold value will be described. The digital coherent optical receiver 310 compares the wavelength dispersion value with the threshold value ($Th_2$) 1206, to select a first moving average frequency if the wavelength dispersion value is greater than $Th_1$, or to select a second moving average frequency if the wavelength dispersion value is less than or equal to $Th_1$.

The first moving average frequency is a desirable moving average frequency for PM, and the second moving average frequency is a desirable moving average frequency for IM/PM. The first and second moving average frequencies are set in the digital coherent optical receiver 310 beforehand. A desirable moving average frequency for each of the schemes may be determined by an arbitrary method among various conventionally known methods or various methods to be developed in future.

As a wavelength dispersion value and a threshold value (Th$_2$) 1206, the same values for the modulation scheme determination or different values may be used.

Alternatively, referring to the example in FIG. 13 again, an embodiment using the two threshold values will be described. The digital coherent optical receiver 310 compares the wavelength dispersion value with two threshold values (Th$_1$ and Th$_2$) 1206 and 1207, to select the first moving average frequency if the wavelength dispersion value is greater than Th$_1$ or less than Th$_2$, or to select a second moving average frequency if the wavelength dispersion value is less than or equal to Th$_1$ and greater than or equal to Th$_2$.

For example, the first moving average frequency is a desirable moving average frequency for PM, and the second moving average frequency is a desirable moving average frequency for IM/PM. The first and second moving average frequencies are set in the digital coherent optical receiver 310 beforehand. A desirable moving average frequency for each of the schemes may be determined by an arbitrary method among various conventionally known methods or various methods to be developed in future.

As a wavelength dispersion value and threshold values (Th$_1$ and Th$_2$) 1206 and 1207, the same values for the modulation scheme determination or different values may be used.

Here, in the examples in FIGS. 12-13, if the transmission distance is short, it may be determined as IM/PM, or a desirable moving average frequency for IM/PM may be selected with a certain threshold value even if it is actually a PM transmission line.

However, if PM is used for a short transmission distance, ASE is not accumulated much as illustrated in FIGS. 11-13. Therefore, in such a case, if it is determined as IM/PM or a desirable small-value moving average frequency for IM/PM is selected, no problems occur.

<Hardware Configuration of Digital Coherent Optical Receiver>

Figure 14:
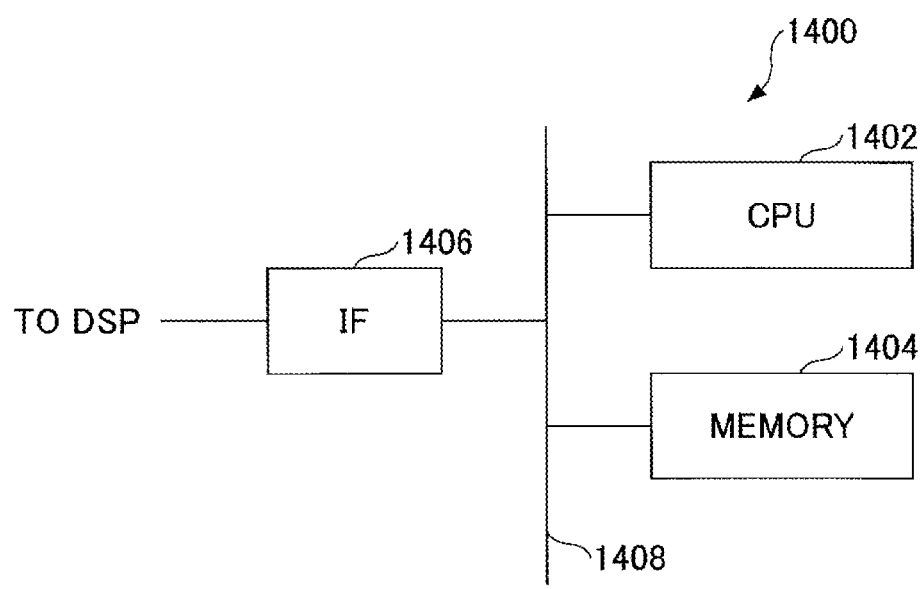
FIG. 14 is a hardware block diagram of a control section according to an embodiment of the present invention.

FIG. 14 is a hardware block diagram 1400 of the control section 325 illustrated in FIGS. 3-4 according to an embodiment of the present invention. FIG. 14 includes a CPU 1402, a memory 1404, an interface 1406, and a bus 1408.

The CPU 1402 executes functions of the determination section 440 and the selection section 450 in FIG. 4.

The memory 1404 stores one or multiple threshold values used in the determination section 440, and moving average frequencies used in the selection section 450. The memory 1404 may be integrated into the CPU 1402.

The interface 1406 is an interface with the DSP 324 for communication.

The bus 1408 connects the configuration elements 1402-1406 and/or other configuration elements in the device with each other, to enable communication among these configuration elements.

<Control Method of a Digital Coherent Optical Receiver>

Figure 15:
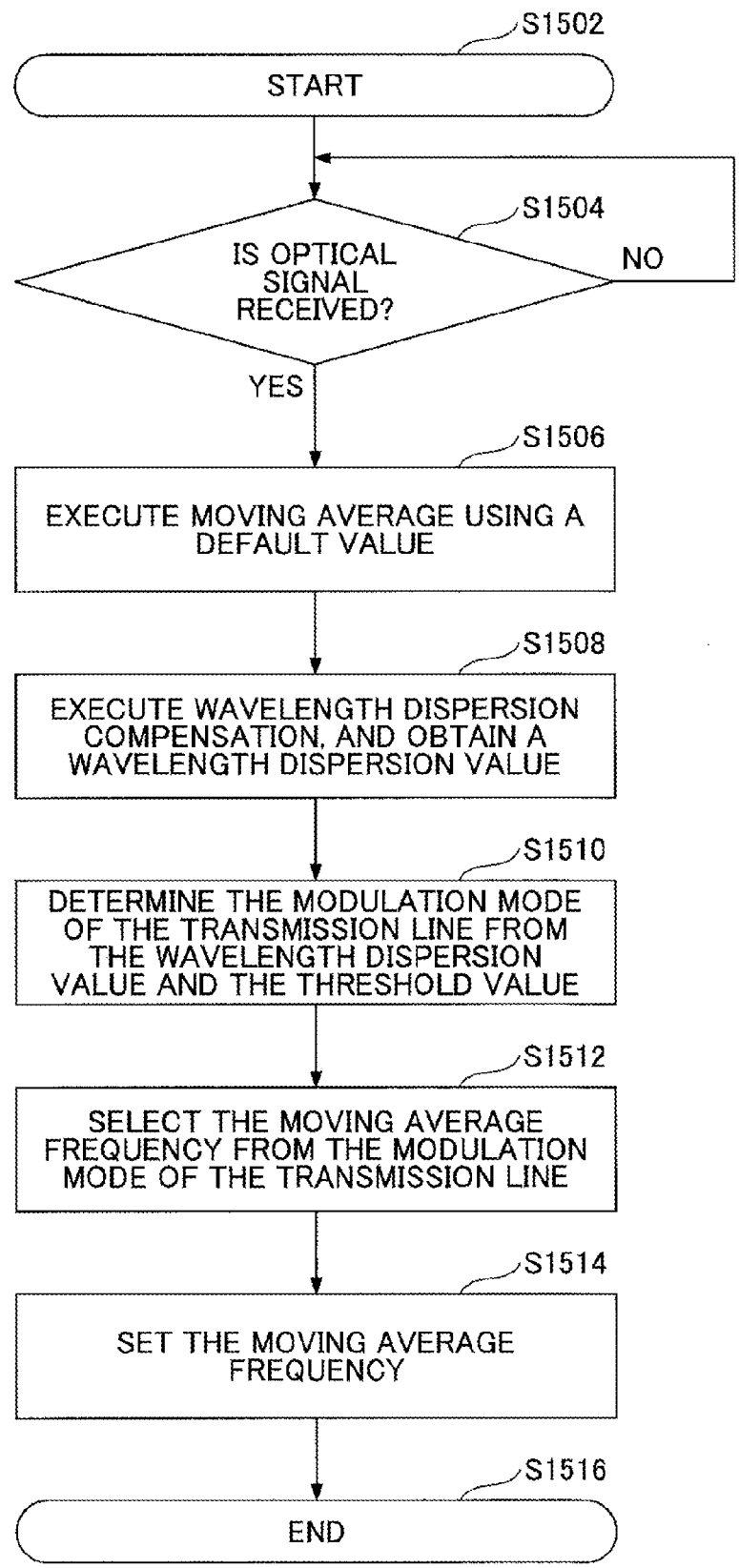
FIG. 15 is a schematic view illustrating a flowchart of a control method according to an embodiment of the present invention.

FIG. 15 is a schematic view illustrating a flowchart of a control method according to an embodiment of the present invention. The control method is executed by the digital coherent optical receiver 310 illustrated in FIG. 3.

The control method starts with Step S1502.

At Step S1504, the digital coherent optical receiver 310 monitors whether an optical signal is received. Step S1504 may be executed by the digital coherent optical receiver 310 or the optical front end 312 to monitor whether an optical signal is received, or by the DSP 324 to monitor whether polarization-separated phase data is received. Further alternatively, Step S1504 may be executed by monitoring an input to an arbitrary configuration element in the digital coherent optical receiver 310. If an optical signal is received (YES at Step S1504), the control method moves on to Step S1506.

At Step S1506, the moving average section 410 executes moving average with a frequency set to a default value.

At Step S1508, the waveform distortion compensator 420 executes wavelength dispersion compensation for an output of the moving average section 410. At this time, the waveform distortion compensator 420 transfers the detected and compensated wavelength dispersion value to the determination section 440 of the control section 325.

At Step S1510, the determination section 440 compares the wavelength dispersion value with the threshold value(s) (Th$_1$, or Th$_1$ and Th$_2$) to determine whether the modulation scheme of a transmission line is IM/PM or PM. The determination section 440 transfers the determined result to the selection section 450.

At Step S1512, based on the determined modulation scheme, the selection section 450 selects a moving average frequency associated with the modulation scheme.

At Step S1514, the selection section 450 sets the selected moving average frequency into the moving average section 410.

At Step S1516, the control method ends.

Alternatively, Steps 1510 and 1512 may be integrated, and based on a result of comparing the wavelength dispersion value with the threshold value, for example, to select a moving average frequency associated with a range of the wavelength dispersion value. In this case, it is possible to skip determination of the modulation scheme.

As described above, a moving average frequency to be executed is determined based on a wavelength dispersion value. Therefore, it is not necessary to collect information about the modulation scheme of a transmission line beforehand, which makes it possible for a digital coherent optical receiver to operate promptly once a signal is received to select and set a moving average frequency.

Also, if using an OUPSR (Optical Unidirectional Path-Switched Ring) scheme for switching to a redundant path when a fault occurs, it is difficult to collect information about the redundant path before switching for determining a moving average frequency. Also in such a case, a digital coherent optical receiver can select and set a moving average frequency for operation promptly with a switching, which enables a rapid switch operation according to an embodiment of the disclosures.

Moreover, if a fault occurs in a mesh network, a detour path may not be determined in advance because the path is determined with searching by restoration. In such a case, if information about the modulation scheme of the path is collected to determine a moving average frequency after the path has been established, it takes a very long time to recover. Also in such a case, a digital coherent optical receiver can select and set a moving average frequency for operation promptly with the determination of the path, which enables a rapid restoration operation according to an embodiment of the disclosures.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A digital coherent optical receiver executing coherent reception of a phase-modulated optical signal, comprising:
   a moving average section configured to execute a moving average for received data obtained by sampling of the phase-modulated optical signal;
   a compensator configured to compensate a wavelength dispersion value of the phase data having been executed with the moving average; and
   a control section configured to determine a moving average frequency to be executed by the moving average section based on the compensated wavelength dispersion value,
   wherein the control section determines a modulation scheme used by the phase-modulated optical signal, based on the wavelength dispersion value compensated by the compensator, and selects the moving average frequency to a frequency associated with the determined modulation scheme.

2. The digital coherent optical receiver as claimed in claim 1, wherein the control section selects a first moving average frequency as the moving average frequency to be executed by the moving average section when the wavelength dispersion value is greater than a threshold value, and otherwise selects a second moving average frequency which is less than the first moving average frequency.

3. The digital coherent optical receiver as claimed in claim 2, wherein the threshold value is an upper limit of the wavelength dispersion value permissible when using an intensity modulation scheme.

4. A transmission apparatus comprising a digital coherent optical receiver as claimed in claim 1.

5. A digital coherent optical receiver executing coherent reception of a phase-modulated optical signal, comprising:
   a moving average section configured to execute a moving average for received data obtained by sampling of the phase-modulated optical signal;
   a compensator configured to compensate a wavelength dispersion value of the phase data having been executed with the moving average; and
   a control section configured to determine a moving average frequency to be executed by the moving average section based on the compensated wavelength dispersion value,
   wherein the control section selects a first moving average frequency as the moving average frequency to be executed by the moving average section when the wavelength dispersion value is less than or equal to a first threshold value and greater than or equal to a second threshold value which is less than the first threshold value, or selects a second moving average frequency which is less than the first moving average frequency when the wavelength dispersion value is greater than the first threshold value or less than the second threshold value.

6. The digital coherent optical receiver as claimed in claim 5, wherein the first threshold value is 0 ps/nm.

7. The digital coherent optical receiver as claimed in claim 5, wherein the second threshold value is a lower limit of the wavelength dispersion value permissible when using an intensity modulation scheme.

8. A method of controlling a digital coherent optical receiver executing coherent reception of a phase-modulated optical signal, comprising:
   executing a moving average for received data obtained by sampling of the phase-modulated optical signal;
   compensating a wavelength dispersion value of the phase data having been executed with the moving average; and
   determining a moving average frequency to be executed when the moving average is executed based on the compensated wavelength dispersion value,
   wherein the determining determines a modulation scheme of the phase-modulated optical signal, based on the wavelength dispersion value compensated by the compensating, and selects the moving average frequency to a frequency associated with the determined modulation scheme.

9. The method of controlling a digital coherent optical receiver as claimed in claim 8, wherein determines the moving average frequency by selecting a first moving average frequency as the moving average frequency to be executed by the moving average section when the wavelength dispersion value is greater than a threshold value, and otherwise by selecting a second moving average frequency which is less than the first moving average frequency.

10. The method of controlling a digital coherent optical receiver as claimed in claim 9, wherein the threshold value is an upper limit of the wavelength dispersion value permissible when using an intensity modulation scheme.

11. A method of controlling a digital coherent optical receiver executing coherent reception of a phase-modulated optical signal, comprising:
   executing a moving average for received data obtained by sampling of the phase-modulated optical signal;
   compensating a wavelength dispersion value of the phase data having been executed with the moving average; and
   determining a moving average frequency to be executed when the moving average is executed based on the compensated wavelength dispersion value,
   wherein the determining determines that only a phase modulation scheme is included in modulation schemes used in a transmission line through which the phase-modulated optical signal is transmitted when the wavelength dispersion value is greater than a threshold value, and otherwise determines that an intensity modulation scheme is included in the modulation schemes, and based on the determined modulation scheme, selects the moving average frequency to be executed.

12. A digital coherent optical receiver executing coherent reception of a phase-modulated optical signal, comprising:
   a moving average section configured to execute a moving average for received data obtained by sampling of the phase-modulated optical signal;
   a compensator configured to compensate a wavelength dispersion value of the phase data having been executed with the moving average; and
   a control section configured to determine a moving average frequency to be executed by the moving average section based on the compensated wavelength dispersion value,
   wherein the control section determines that only a phase modulation scheme is included in modulation schemes used in a transmission line through which the phase-modulated optical signal is transmitted when the wavelength dispersion value is greater than a threshold value, and otherwise determines that an intensity modulation scheme is included in the modulation schemes, and based on the determined modulation scheme, selects the moving average frequency to be executed.

13. A method of controlling a digital coherent optical receiver executing coherent reception of a phase-modulated optical signal, comprising:
   executing a moving average for received data obtained by sampling of the phase-modulated optical signal;
   compensating a wavelength dispersion value of the phase data having been executed with the moving average; and determining a moving average frequency to be executed when the moving average is executed based on the compensated wavelength dispersion value, wherein the determining selects a first moving average frequency as the moving average frequency to be executed by the moving average section when the wavelength dispersion value is less than or equal to a first threshold value and greater than or equal to a second threshold value which is less than the first threshold value, or selects a second moving average frequency which is less than the first moving average frequency when the wavelength dispersion value is greater than the first threshold value or less than the second threshold value.

14. The method of controlling a digital coherent optical receiver as claimed in claim 13, wherein the first threshold value is 0 ps/nm.

15. The method of controlling a digital coherent optical receiver as claimed in claim 13, wherein the second threshold value is a lower limit of the wavelength dispersion value permissible when using the intensity modulation scheme.

* * * * *